(12) United States Patent
Hoque et al.

(10) Patent No.: US 7,821,328 B2
(45) Date of Patent: Oct. 26, 2010

(54) DYNAMIC CHARGE PUMP SYSTEM FOR FRONT END PROTECTION CIRCUIT

(75) Inventors: Mohammad Rashedul Hoque, Allen, TX (US); Ken R. King, Lucas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 19 days.

(21) Appl. No.: 12/338,820

(22) Filed: Dec. 18, 2008

(65) Prior Publication Data

US 2010/0156518 A1  Jun. 24, 2010

(51) Int. Cl.
*G05F 1/10* (2006.01)
(52) U.S. Cl. .................. 327/536; 327/540; 363/60; 323/312
(58) Field of Classification Search .............. 327/536; 363/59–60
See application file for complete search history.

(56) References Cited

U.S. PATENT DOCUMENTS

| | | | | | |
|---|---|---|---|---|---|
| 5,426,334 | A | * | 6/1995 | Skovmand | 327/427 |
| 5,635,868 | A | * | 6/1997 | Aiello et al. | 327/538 |
| 5,689,208 | A | * | 11/1997 | Nadd | 327/390 |
| 6,040,736 | A | * | 3/2000 | Milanesi et al. | 327/541 |
| 6,049,201 | A | * | 4/2000 | Feldtkeller | 323/288 |
| 6,169,431 | B1 | * | 1/2001 | Xu | 327/109 |
| 6,483,376 | B1 | * | 11/2002 | Bienvenu et al. | 327/536 |
| 6,556,069 | B1 | * | 4/2003 | Casier et al. | 327/540 |
| 6,566,847 | B1 | * | 5/2003 | Chou et al. | 323/282 |
| 7,106,039 | B1 | * | 9/2006 | Scott et al. | 323/303 |
| 2006/0203400 | A1 | * | 9/2006 | Bodano et al. | 361/18 |
| 2008/0002325 | A1 | * | 1/2008 | Kato et al. | 361/101 |
| 2008/0169863 | A1 | * | 7/2008 | Fukami | 327/536 |

\* cited by examiner

*Primary Examiner*—Lincoln Donovan
*Assistant Examiner*—Thomas J Hiltunen
(74) *Attorney, Agent, or Firm*—John J. Patti; Wade J. Brady, III; Frederick J. Telecky, Jr.

(57) ABSTRACT

Various apparatuses, methods and systems for a front end protection circuit with a dynamic charge pump system are disclosed herein. For example, some embodiments provide an apparatus such as a voltage regulator, a current regulator, a driver circuit or a switch protection circuit. The apparatus includes an output switch, a switch controller and a voltage threshold detector. The apparatus operates in a reduced power mode when the threshold detector detects a feedback level passing a threshold. In some particular embodiments, the switch controller includes a charge pump and an oscillator that run at lower speeds to reduce power usage when the feedback level passes the threshold. In various embodiments, the feedback level is a voltage level at the output switch control input, the output voltage from the output switch, or the output current from the output switch.

15 Claims, 5 Drawing Sheets

US 7,821,328 B2

DYNAMIC CHARGE PUMP SYSTEM FOR FRONT END PROTECTION CIRCUIT

BACKGROUND

Electronic devices typically require a regulated supply of power to maintain a voltage or current level within acceptable limits. There is great pressure to reduce the size and cost of voltage and current regulators for electronic devices while maintaining acceptable output characteristics. This is particularly true for portable electronic devices such as mobile phones, portable media players or navigation devices, etc. These devices often contain rechargeable batteries such as lithium-ion batteries and operate within a well defined range of voltages and currents. Simple front end protection devices such as over-voltage and over-current supervisory circuits are often included that regulate the input voltage and shut down the system if a fault condition arises by turning off the input voltage. However, these front end protection devices typically draw a large quiescent current when actively monitoring input conditions, because the regulator circuits continue to operate at full speed during that time. This is undesirably wasteful of power and may cause a portable electronic device to exceed quiescent current limits. For example, systems designed according to the Universal Serial Buss On The Go (USBOTG) specification are often limited to a quiescent current of less than 100 μA. Thus, typical front end protection devices with large quiescent currents may not meet new standards for power requirements and may excessively drain batteries in portable devices.

SUMMARY

Various apparatuses, methods and systems for a front end protection circuit with a dynamic charge pump system are disclosed herein. For example, some embodiments provide an apparatus such as a voltage regulator, a current regulator, a driver circuit or a switch protection circuit. The apparatus includes an output switch, a switch controller and a voltage threshold detector. The apparatus operates in a reduced power mode when the threshold detector detects a feedback level passing a threshold. In some particular embodiments, the switch controller includes a charge pump and an oscillator that run at lower speeds to reduce power usage when the feedback level passes the threshold. In various embodiments, the feedback level is a voltage level at the output switch control input, the output voltage from the output switch, or the output current from the output switch.

Other embodiments provide a method of reducing power usage in an electrical apparatus, including controlling an output switch in the electrical apparatus with a switch controller operating in a high power mode, detecting a level from a feedback node in the electrical apparatus, comparing the level with a threshold, and placing the apparatus in a reduced power mode when the level passes a threshold. In various instances of these embodiments, the power is reduced by reducing the frequency of an oscillator. This may be performed by generating a feedback signal from the output switch control input using a Zener diode. When the voltage at the output switch control input reaches the breakdown voltage of the Zener diode, current flows through the Zener diode to generate the feedback signal that reduces the frequency of the oscillator. The generating of the feedback signal may further include mirroring a current from the Zener diode to the input of the oscillator to reduce the frequency of the oscillator. In other embodiments of the method, a bias current may be applied to the input of the oscillator and the bias current to the input of the oscillator is reduced by the mirrored current from the Zener diode to reduce the frequency of the oscillator.

Other embodiments provide a voltage regulator including an output switch having a power input, a power output and a control input. The voltage regulator also includes a charge pump having a clock input and an output, the output being connected to the output switch control input. An oscillator is included having a control input and a clock output, with the clock output being connected to the charge pump clock input. A voltage divider including an input and an output has the input connected to the output switch power output. The voltage regulator also includes an amplifier having a first input, a second input and an output. The first input is connected to the output of the voltage divider and the second input is connected to a reference voltage. A transistor is included having a drain connected to the charge pump output, a source connected to a current mirror input and a gate connected to the output of the amplifier. A Zener diode having a cathode and an anode has the cathode connected to the charge pump output. A second transistor has a source connected to the anode of the Zener diode and a gate connected to the output switch power output. The voltage regulator also includes a current mirror including a third transistor and a fourth transistor, the third transistor having a drain and a gate both connected to a drain of the second transistor and having a source connected to the ground. The fourth transistor has a gate connected to the drain and gate of the third transistor and a source connected to the ground. A current source is connected to the oscillator control input and to a drain of the fourth transistor. The oscillator is adapted to operate at a lower frequency when a voltage at the charge pump output is at a breakdown voltage of the Zener diode and the current mirror steals current from the current source away from the oscillator control input. The oscillator is also adapted to operate at a higher frequency when the voltage at the charge pump output is less than the breakdown voltage of the Zener diode.

This summary provides only a general outline of some particular embodiments. Many other objects, features, advantages and other embodiments will become more fully apparent from the following detailed description, the appended claims and the accompanying drawings.

BRIEF DESCRIPTION OF THE DRAWINGS

A further understanding of the various embodiments may be realized by reference to the figures which are described in remaining portions of the specification. In the figures, like reference numerals may be used throughout several drawings to refer to similar components.

DESCRIPTION

The drawings and description, in general, disclose various embodiments of a voltage and current regulating front end protection circuit with a low quiescent current. In one particular embodiment, the front end protection circuit operates as an over-voltage and over-current supervisory circuit monitoring an output voltage and output current. During normal operation, the front end protection circuit does not regulate the output current or output voltage. If a fault arises, the front end protection circuit regulates the output current or voltage. The front end protection circuit disclosed herein has a dramatically reduced quiescent current, saving power and reducing battery drain.

Note that the systems, apparatuses and methods disclosed herein for reducing the quiescent current are not limited to application in the voltage regulating front end protection circuit disclosed herein, but may be used in any suitable electronic circuit, including for example other voltage or current supervisory systems or regulators.

In one particular embodiment, the circuit capable of dramatically reducing the quiescent current is included in a front end protection circuit, specifically a Low Drop Out (LDO) voltage regulator with a charge pump and an NMOS pass device. This architecture provides a relatively low die cost. The efficiency of the charge pump and/or oscillator is the limiting factor for the design, especially when the switching frequency is more than 1 MHz. A relatively high switching frequency, for example greater than 3 MHz, may be used to achieve a fast transient performance. To provide a low quiescent current while retaining a fast transient performance, the oscillator and charge pump are operated in three different modes of operation. These three modes are Drop Out, Voltage Regulation and Current Regulation. When the output voltage or current is below regulation threshold, referred to as Drop Out mode, the circuit saves quiescent current by way of detecting the gate to source voltage of the NMOS pass device and slowing the oscillator. When either the output voltage or load current exceeds the voltage or current regulation thresholds the circuit saves quiescent current by way of also slowing the oscillator.

Figure 1:
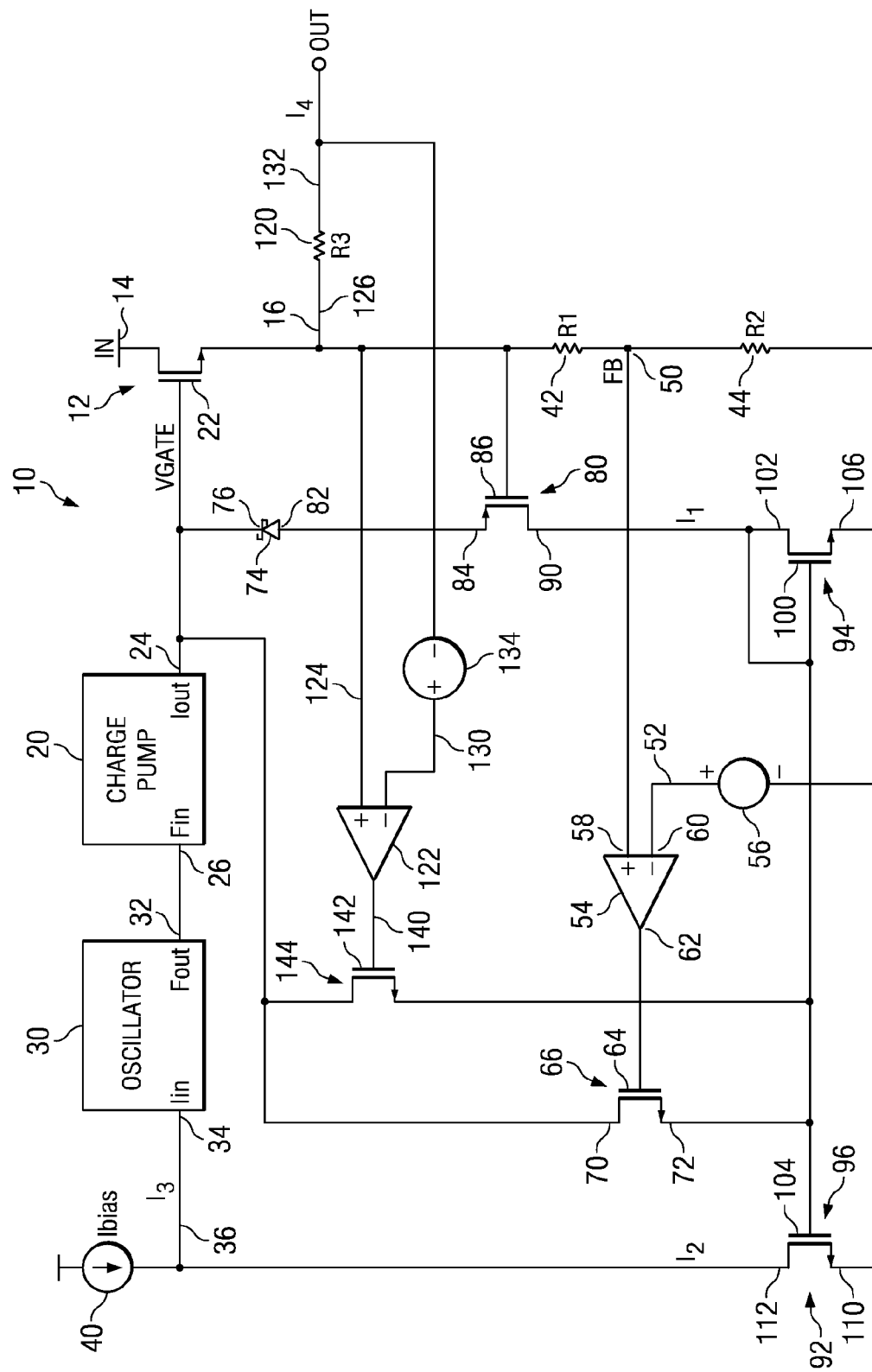
FIG. 1 depicts a voltage and current regulating front end protection circuit.

Referring now to FIG. 1, one example of a front end protection circuit 10 with multiple operating modes and a low quiescent current will be described. An NMOS transistor is used as a pass device or output switch 12, allowing current from an input 14 to be connected to or disconnected from an output 16. The output switch 12 is controlled by a charge pump 20 that deposits charge on the control input or gate 22 of the output switch 12, building up the gate voltage $V_{GATE}$ until the output switch 12 begins to conduct current from the input 14 to the output 16. The charge pump 20 is frequency controlled, with the current at the output 24 of the charge pump 20 being proportional to the frequency of a signal at the input 26 of the charge pump 20. An oscillator 30 is used to drive the charge pump 20. In one particular embodiment, the oscillator 30 is current controlled, with the frequency at the output 32 being proportional to a current at the input 34 of the oscillator 30. In this embodiment, the frequency of the oscillator 30 is controlled by a bias current $I_3$ 36 from a reference current source 40.

A voltage feedback loop is included to supervise and regulate the voltage at the output 16. The output voltage is measured using a resistive voltage divider having an upper resistor 42 and a lower resistor 44 connected in series between the output 16 and ground 46. The voltage FB at the node 50 between the upper resistor 42 and lower resistor 44 is compared with a reference voltage 52 by an amplifier 54. The reference voltage 52 may be generated by any suitable device, such as a bandgap voltage reference 56. The signal from node 50 is connected to a non-inverting input 58 of the amplifier 54, and the reference voltage 52 is connected to an inverting input 60 of the amplifier 54. When the voltage at node 50 exceeds the reference voltage 52, indicating that the voltage at the output 16 has exceeded a predetermined limit, the output 62 of the amplifier 54 is asserted. The output 62 of the amplifier 54 is connected to the control input of a transistor, such as the gate 64 of an NMOS transistor 66. The transistor 66 is connected between the gate 22 of the output switch 12 and gate 100 of NMOS 94, so that the charge deposited on the gate 22 of the output switch 12 by the charge pump 20 can be drawn off to drain through NMOS 94 when the voltage at the output 16 is too high. This reduces or turns off the conductivity of the output switch 12, reducing or turning off the current at the output 16.

A current feedback loop is included to supervise and regulate the current through the output 16. The output current is measured using a current sensing resistor 120 connected in series with the output 16. The output current may be measured in any suitable manner in other embodiments. The current through the output 16 generates a voltage across current sensing resistor 120. The voltage across current sensing resistor 120 is compared with a reference voltage by an amplifier 122. For example, a non-inverting input 124 of the amplifier 122 may be connected to one side 126 of the current sensing resistor 120, and the inverting input 130 may be connected to the other side 132 of the current sensing resistor 120 through a voltage offset device such as a floating reference voltage source 134. When the output current exceeds the threshold level set by the floating reference voltage source 134 and the value of the current sensing resistor 120, indicating that the current through the output 16 has exceeded a predetermined limit, the output 140 of the amplifier 122 is asserted. The output 140 of the amplifier 122 is connected to the control input of a transistor, such as the gate 142 of an NMOS transistor 144. The transistor 144 is connected between the gate 22 of the output switch 12 and gate 100 of NMOS 94, so that the charge deposited on the gate 22 of the output switch 12 by the charge pump 20 can be drawn off to drain through NMOS 94 when the current through the output 16 is too high. This reduces or turns off the conductivity of the output switch 12, reducing or turning off the current at the output 16.

The quiescent current-limiting during fault conditions is performed by reducing the bias current 36 at the input 34 to the oscillator 30 during fault conditions as shown in FIG. 1. Fault conditions may include drop out, voltage or current regulation. In one particular embodiment, drop out conditions are indicated by a high gate to source voltage $V_{GATE}$ at the gate 22 of the output switch 12. This is detected in this particular embodiment by a Zener diode 74 having a cathode 76 connected to the gate 22 of the output switch 12. In this particular embodiment, a PMOS transistor 80 is connected to the anode 82 of the Zener diode 74 and the output 16 so that the breakdown voltage of the Zener diode 74 is referenced to the voltage at the output 16. Specifically, the source 84 of the transistor 80 is connected to the anode 82 of the Zener diode 74 and the gate 86 of the transistor 80 is connected to the output 16. The drain 90 of the transistor 80 is connected to a current mirror 92 that steals current from the reference current source 40 away from the bias current 36 at the input 34 of the oscillator 30 when the front end protection circuit 10 is in a drop out condition and the Zener diode 74 is in breakdown and conducting. The current mirror 92 includes a diode-connected primary transistor 94 and a secondary transistor 96. The gate 100 and drain 102 of the primary transistor 94 are both connected to the drain 90 of the transistor 80, and to the gate 104 of the secondary transistor 96. The source 106 of the primary transistor 94 and the source 110 of the secondary transistor 96 are both connected to ground 46. The drain 112 of the secondary transistor 96 is connected to the reference current source 40 and to the input 34 of the oscillator 30. Thus, when the Zener diode 74 is in breakdown due to a drop-out condition raising the voltage at the gate 22 of the output switch 12, the current mirror is conducting. This causes a current $I_2$ at the drain 112 of the secondary transistor 96, which steals current from the reference current source 40 that would otherwise all contribute to the bias current $I_3$ 36 at the input 34 of the oscillator 30. This reduces the bias current $I_3$ 36 into the oscillator 30, slowing the oscillator 30 and consequently the charge pump 20, slowing the transfer of electrical charge onto the gate 22 of the output switch 12 by the charge pump 20.

The breakdown voltage of the Zener diode 74 is selected to be lower than the maximum gate to source voltage $V_{GATE}$ of the output switch 12 in order to protect the output switch 12.

Note that the current mirror 92 may be implemented in any desired manner and is not limited to the simple two transistor topology shown in FIG. 1. Furthermore, the current mirror 92 does not necessarily have matched transistors or other conditions. Therefore, the output current $I_2$ at the drain 112 of the secondary transistor 96 is proportional to but not necessarily equal to the input current $I_1$ at the drain 102 of the primary transistor 94.

Note also that the front end protection circuit 10 of FIG. 1 has been simplified and made generic to more clearly describe the system for reducing quiescent current, including the detection of the voltage at the gate 22 of the output switch 12 and the resulting slowing of the oscillator 30 and charge pump 20. The front end protection circuit 10 or any other circuit in which a reduced quiescent current system is included is not limited to the schematic of FIG. 1. For example, the Zener diode 74 may be replaced with any voltage detection device, including any device that breaks down such as one or more stacked diodes, an active component such as a comparator or amplifier, or any other suitable device for determining when the front end protection circuit 10 is in a drop out condition. The output of this drop out condition detection may be used in any suitable manner to slow the oscillator 30 and the charge pump 20 or otherwise operate to reduce the quiescent current used by the front end protection circuit 10 during the drop out condition. Other semiconductor process technologies may be used, such as using bipolar processes rather than CMOS. Therefore, in the description herein and the associated claims, semiconductors of different processes with analogous functions are to be considered equivalent. For example, a CMOS gate may be considered equivalent to a bipolar base, drain to collector, source to emitter, etc.

During operation, the initial voltage at the output 16 is zero when the front end protection circuit 10 is just turned on. The voltage at the gate 22 of the output switch 12 is zero, so no current flows through the Zener diode 74 and the current mirror 92 is off. The current from the reference current source 40 all travels into the oscillator 30, causing it to run at peak frequency. This clocks the charge pump 20 at peak frequency and beginning to charge the gate 22 of the output switch 12. Because the output switch 12 is turned off, the voltage at the output 16 remains low and the transistor 66 is turned off. Also, because the output switch 12 is turned off the output current I4 remains low and the transistor 144 is turned off. Thus, there is no outlet for the charge deposited on the gate 22 of the output switch 12, so the voltage at the gate 22 begins to rise. As soon as the voltage at the gate 22 rises above the voltage at the output 16 by a threshold voltage of about a volt, the output switch 12 begins to conduct, pulling the output 16 up further by the input 14 and sourcing current to the output 16 from the input 14. The output switch 12 acts as a source follower, so the voltage at the output 16 at the source of the output switch 12 follows the voltage at the gate 22, with the voltage at the output 16 rising with the voltage at the gate 22.

If the voltage at the output 16 rises high enough so the feedback voltage at node 50 meets or exceeds the reference voltage 52, transistor 66 is turned on by the amplifier 54, preventing the voltage at the gate 22 of output switch 12 from rising any higher by closing the feedback loop through the amplifier 54 and transistor 66. The charge pump 20 has a finite output capability when the reference current source 40 is entirely directed into the oscillator 30 and the oscillator 30 is running at peak frequency. The transistor 66 pulls current from the output 24 of the charge pump 20 and discharging into current mirror 92, preventing it from further charging the gate 22 of the output switch 12. The transistor 66 operates in an analog mode causing the output 16 to settle out to a voltage that is a resistor divider ratio above the reference voltage 52.

The charge pump 20 continues to pump charge to the output 24 with the transistor 66 drawing off that additional charge. The current through the source 72 of transistor 66 flows into current mirror 92. This slows the oscillator frequency which reduces charge pump output current as described in the drop out operation and subsequently reducing quiescent current. Similarly, when the current through the output 16 is excessive and the circuit 10 is in current regulation, current through transistor 144 flows into the current mirror 92. This also slows the oscillator frequency which reduces charge pump output current as described in the drop out operation and subsequently reducing quiescent current.

The gain of the current mirror 92 may be adjusted as desired to make the oscillator 30 run at a suitable frequency to balance the quiescent current requirements with the transient response.

The charge pump output can be protected from excessive voltage by connecting a resistive divider from charge pump output to ground and using another amplifier and transistor to dump current into current mirror 92. This will also reduce quiescent current.

Figure 2:
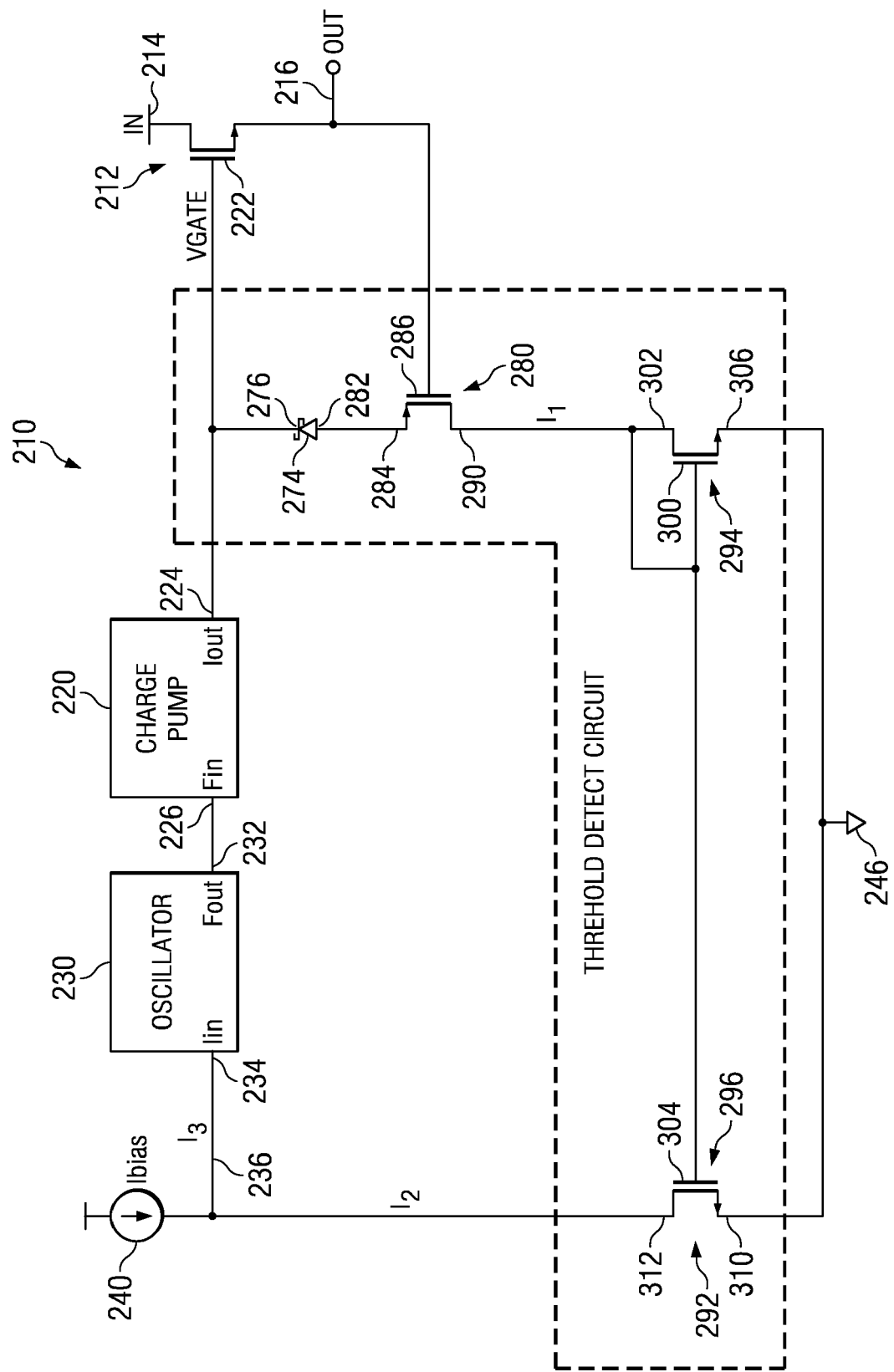
FIG. 2 depicts an embodiment of an NFET driver circuit.

Referring now to FIG. 2, another particular embodiment will be described. In this embodiment, an NMOS Driver circuit 210 is described which is adapted to provide a low quiescent current during operation while limiting the gate to source voltage to a safe level. An NMOS transistor is used as an output switch 212, connected between an input 214 and an output 216. A frequency controlled charge pump 220 controls the output switch 212, with the gate 222 connected to the output 224 of the charge pump 220. The input 226 of the charge pump 220 is driven by a current controlled oscillator 230. The output 232 of the oscillator 230 is connected to the input 226 of the charge pump 220. The frequency at the output 232 is proportional to the bias current 236 current at the input 234 of the oscillator 230. The bias current 236 is provided by a reference current source 240 connected to the input 234 of the oscillator 230.

The current mirror 292 includes a diode-connected primary transistor 294 and a secondary transistor 296. The gate 300 and drain 302 of the primary transistor 294 are both connected to the drain 290 of the transistor 280, and to the gate 304 of the secondary transistor 296. The source 306 of the primary transistor 294 and the source 310 of the secondary transistor 296 are both connected to ground 246. The drain 312 of the secondary transistor 296 is connected to the reference current source 240 and to the input 234 of the oscillator 230.

The front end protection circuit 210 also includes a Zener diode 274 having a cathode 276 connected to the gate 222 of the output switch 212 and an anode 282 connected to the source 284 of a transistor 280. The gate 286 of the transistor 280 is connected to the output 216, and the drain 290 is connected to the drain 302 of the primary transistor 294 in the current mirror 292. This portion of the front end protection circuit 210 operates similarly to the front end protection circuit 10 of FIG. 1, with the Zener diode 274 operating in conjunction with the current mirror 292 to place the front end protection circuit 210 in steady state mode during a dropout fault mode.

Figure 3:
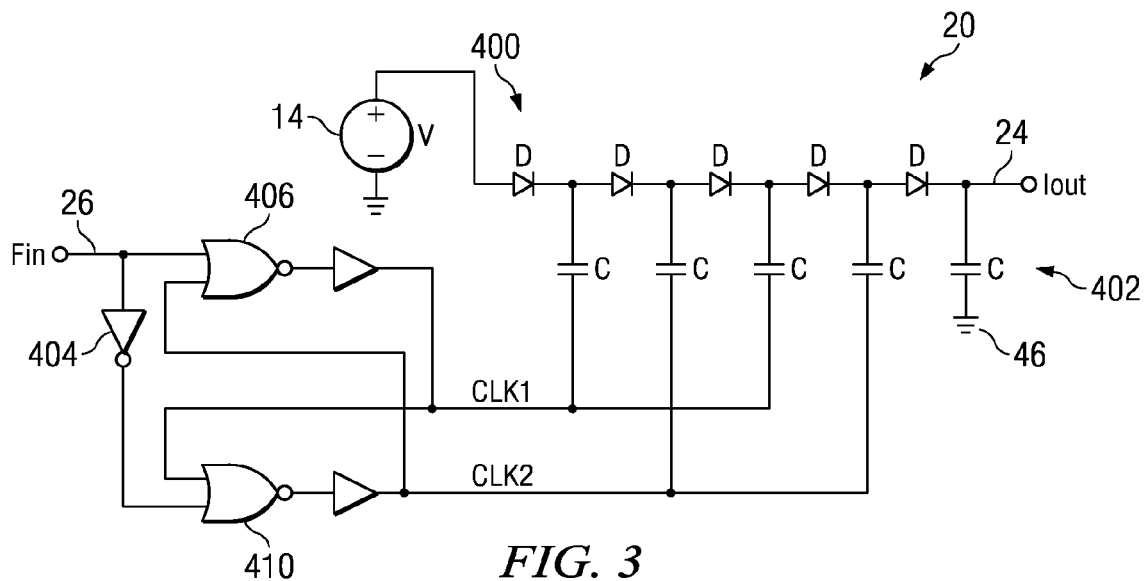
FIG. 3 depicts one particular embodiment of a charge pump.

Referring now to FIG. 3, one example of a charge pump 20 that may be included in a front end protection circuit 10 will be described in more detail. However, it is important to note that the charge pump 20 is not limited to any particular topology. Charge is pumped along a diode chain 400 from an input voltage source (e.g., 14) to the output 24 as capacitors 402 are successively charged and discharged during each clock cycle. A pair of non-overlapping clocks are used to successively charge and discharge the capacitors 402. The pair of non-overlapping clocks are generated from the input 26 from the oscillator 30 using an inverter 404 and a pair of cross-coupled NOR gates 406 and 410. The number of stages in the charge pump 20 may be adapted as desired based on the desired charge pump output voltage level. The faster the clock signal coming in on the input 26, the more rapidly the charge pump 20 transfers the charge along the diode chain 400, pulling current from the input 14 to the output 24.

Figure 4:
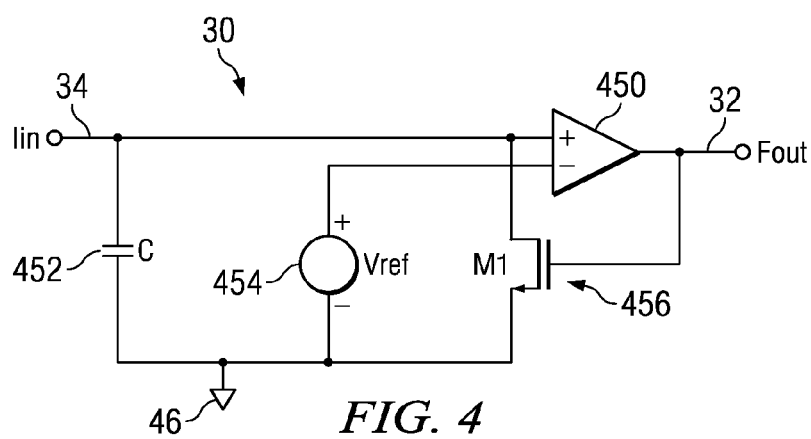
FIG. 4 depicts one particular embodiment of a current controlled oscillator.

Referring now to FIG. 4, one particular example of a oscillator 30 that may be used in a front end protection circuit 10 with low quiescent current will be described. The oscillator 30 may have any architecture, as long as it has a sufficiently wide dynamic range to support the steady state mode and transient mode based on the current at the input 34. An amplifier 450 is used to compare the voltage on a timing capacitor 452 and the voltage from a reference voltage source 454 as the timing capacitor 452 is alternately charged and discharged under the control of a feedback transistor 456.

In some other embodiments of the front end protection circuits 10 and 210, the anode 82 of the Zener diode 74 may be connected directly to the drain 102 of the primary transistor 94 in the current mirror 92. This would provide a simpler circuit, although the voltage at the gate 22 of the output switch 12 would be referenced to the ground 46 rather than to the output 16. By including the transistor 80, the voltage at the output 16 may be regulated at a higher level.

Figure 5:
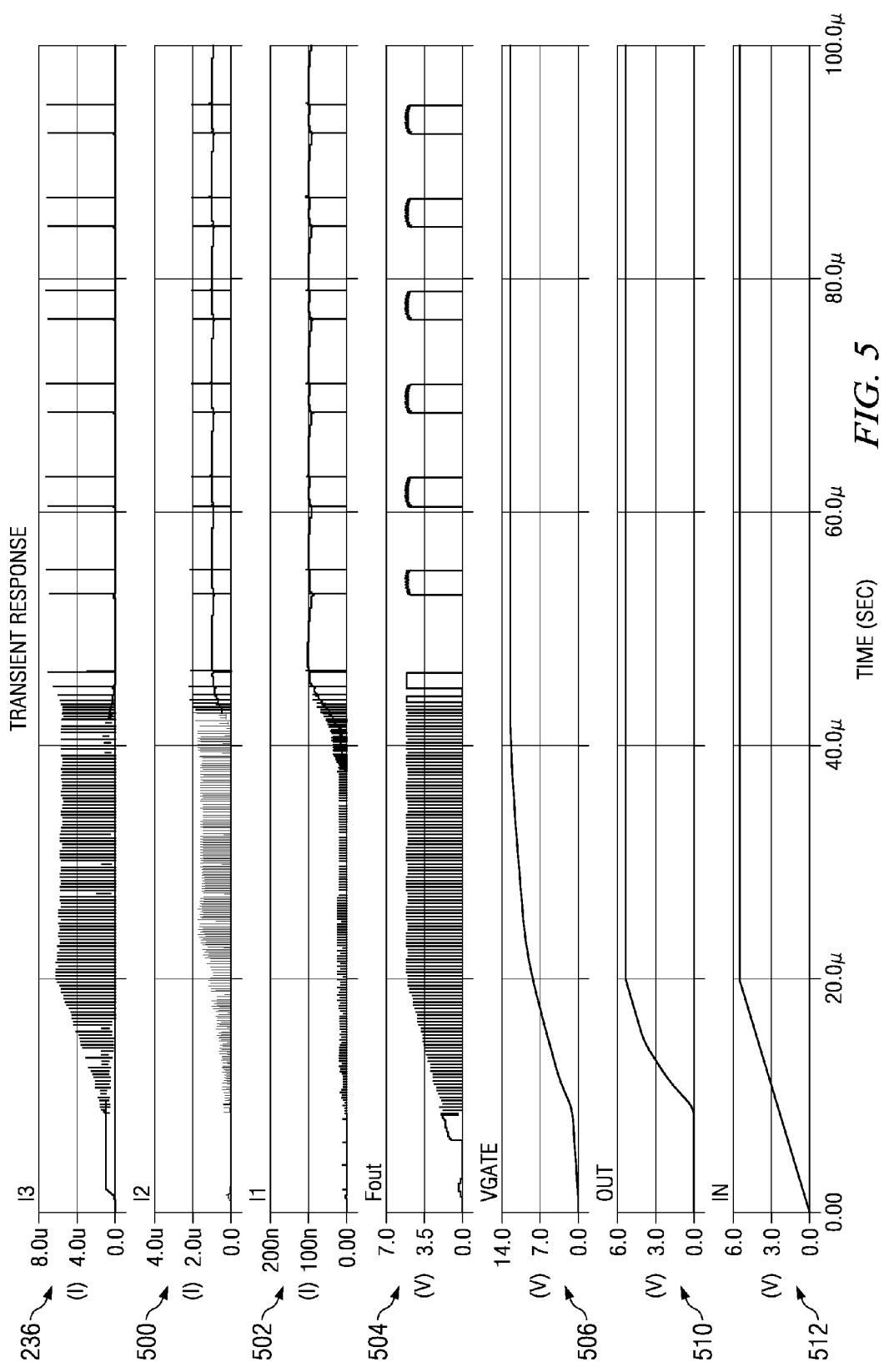
FIG. 5 depicts voltage and current transient response plots of a NFET Driver circuit.

Referring now to FIG. 5, the transient response of the NMOS driver circuit 210 will be described. The plots of FIG. 5 show the bias current $I_3$ 236 into the oscillator 230, the current $I_2$ 500 through the secondary transistor 296 of the current mirror 292, and the current $I_1$ 502 through the Zener diode 274. The plots of FIG. 5 also show the voltage 504 at the output 232 of the oscillator 230, the voltage 506 at the gate 222 of the output switch 212, the voltage 510 at the output 216 and the voltage 512 at the input 214. The plots of FIG. 5 begin when the NMOS Driver circuit 210 has been powered on, so that the voltage 506 at the gate 222 of the output switch 212 begins to rise. The voltage 506 at the gate 222 of the output switch 212 continues to rise until it reaches the breakdown voltage of the Zener diode 274 to place the NMOS Driver circuit 210 in the steady state mode. In steady state mode, current $I_1$ 502 is flowing through the Zener diode 274, and the mirrored current $I_2$ 500 is also flowing, sinking current from the reference current source 240 so that the bias current $I_3$ 236 is low. The oscillator 230 is therefore slowed to a relatively low speed of about 125 kHz, shown in the voltage 504 at the output 232 of the oscillator 230. The voltage 506 at the gate 222 of the output switch 212 is clamped at about 12.5 volts, which is the voltage at the output 216 plus the breakdown voltage of the Zener diode 274. (Note that the voltage 506 at the gate 222 of the output switch 212 is gradually ramping up from about 10 μs to 45 μs.

At about 8 μs, the voltage 504 at the oscillator 230 output 232 shows that the oscillator 230 begins to cycle. This causes charge pump 220 output 224 to begin charging the gate 222 of NMOS transistor 212 as can be seen from 506 voltage beginning to rise. The time between 8 μs and 45 μs is the transient state as shown by the voltage 506 at the gate 222 of NMOS transistor 212 that slowly increases. At time 45 μs current 502 begins to flow through Zener 274 into the drain 302 of transistor 294 of current mirror 292. This causes current 500 to begin to flow in the drain 312 of transistor 296 of current mirror 292. This in turn reduces current 36 to the input 234 of oscillator 230. Due to reduction of current 236 the oscillator 230 output 232 voltage 504 shows the reduction in oscillation frequency. From 45 μs forward in time the NMOS Driver circuit 210 is operating in steady state mode.

Figure 6:
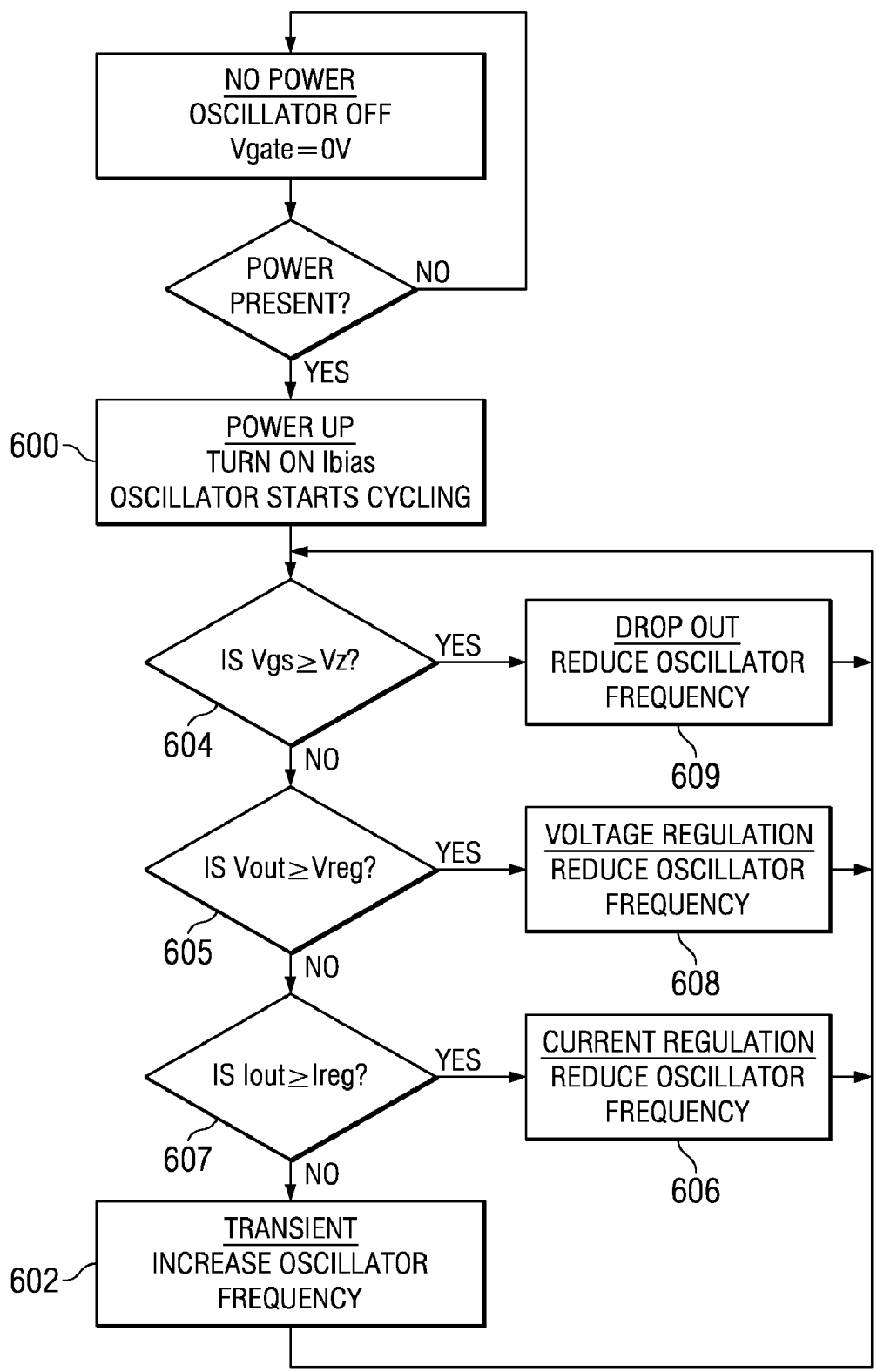
FIG. 6 depicts a state diagram for a voltage and current regulator with output switch protection.

Referring now to FIG. 6, a state diagram for a front end protection circuit including voltage and current regulation and output switch protection will be described, including reducing the quiescent current during error states. In the state diagram of FIG. 6, states are underlined, $V_{GS}$ is the gate to source voltage of the output transistor 12, $V_Z$ is the breakdown voltage of the Zener diode 74, $V_{REG}$ is the threshold for voltage regulation and $I_{REG}$ is the threshold for current regulation. A voltage is applied to the control input of an output switch using a charge pump. (Block 600) For example, the charge pump 20 of FIG. 1 is clocked by the oscillator 30 and deposits charge on the gate 22 of the output switch 12, raising the voltage of the gate 22. Thus, the rate at which the voltage rises is controlled with an oscillator connected to a clock input of the charge pump. (Block 602) The voltage at the control input of the output switch is limited to a first voltage level set by a threshold detector circuit. This first voltage level is therefore the Zener 74 breakdown voltage plus the output 16 voltage. (Block 604) The transistor 66 is turned on and steals current from the gate 22 of the output switch 12 when the amplifier 54 detects that the output 16 has reached a regulation voltage. (Block 605) The second voltage level is therefore the established by reference voltage 52 established by reference generator 56. The transistor 144 is turned on and steals current from the gate 22 of the output switch 12 when the amplifier 122 detects that the output current I4 has reached a regulation current. (Block 607) The third voltage level is therefore established by reference voltage 134 and resistor 120. The frequency of the oscillator is reduced when the voltage at the control input of the output switch reaches any of these three voltage levels. (Blocks 606, 608 and 609) In other words, the front end protection circuit 10 is placed in steady state mode with a low quiescent current when the gate 22 of the output switch 12 reaches the breakdown voltage of the Zener diode 74, or when transistor 66 or 144 is conducting.

The dynamic charge pump system described herein provides for a low quiescent current when a front end protection circuit is in a steady state condition, dramatically reducing the current requirements. The dynamic charge pump system according to another embodiment described herein also provides for a low quiescent current when the front end protection circuit is regulating the output voltage or output current.

While illustrative embodiments have been described in detail herein, it is to be understood that the concepts disclosed herein may be otherwise variously embodied and employed, and that the appended claims are intended to be construed to include such variations, except as limited by the prior art.

What is claimed is:

1. A regulator, comprising:
an output switch having a power input, a power output and a control input;
a charge pump having a clock input and an output, the output being coupled to the output switch control input;
an oscillator having a control input and a clock output, the clock output being coupled to the charge pump clock input;
a voltage divider having an input and an output, the input being coupled to the output switch power output;
an amplifier having a first input, a second input and an output, the first input being coupled to the output of the voltage divider, the second input being coupled to a reference voltage;
a transistor having a drain coupled to the charge pump output, a source coupled to a current mirror input and a gate coupled to the output of the amplifier;
a Zener diode having a cathode and an anode, the cathode being coupled to the charge pump output;
a second transistor having a source coupled to the anode of the Zener diode, and a gate coupled to the output switch power output;
a current mirror comprising a third transistor and a fourth transistor, the third transistor having a drain and a gate both coupled to a drain of the second transistor and having a source coupled to the ground, the fourth transistor having a gate coupled to the drain and gate of the third transistor and a source coupled to the ground;
a current source coupled to the oscillator control input and to a drain of the fourth transistor;
wherein the oscillator is adapted to operate at a lower frequency when a voltage at the charge pump output is at a breakdown voltage of the Zener diode and the current minor steals current from the current source away from the oscillator control input, and wherein the oscillator is adapted to operate at a higher frequency when the voltage at the charge pump output is less than the breakdown voltage of the Zener diode.

2. An apparatus comprising:
a switch having a first passive electrode, a second passive electrode, and a control electrode, wherein the switch receives a supply voltage at its first passive electrode;
a switch controller that is coupled to the control electrode of the switch;
a feedback circuit that is coupled to the second passive electrode of the switch;
a diode that is coupled to the control electrode of the switch;
a transistor having a first passive electrode, a second passive electrode, and a control electrode, wherein the first passive electrode of the transistor is coupled to the diode, and wherein the control electrode of the transistor is coupled to the second passive electrode of the switch;
a current minor that is coupled to the second passive electrode of the transistor; and
a low drop-out regulator (LDO) that is coupled to the feedback circuit, the control electrode of the switch, and the current mirror.

3. The apparatus of claim 2, wherein the apparatus further comprises a current source that is coupled to the switch controller and the current mirror.

4. The apparatus of claim 3, wherein the switch controller further comprises:
an oscillator that is coupled to the current source; and
a charge pump that is coupled between the oscillator and the control electrode of the switch.

5. The apparatus of claim 4, wherein the feedback circuit further comprises a voltage divider that is coupled to the second passive electrode of the switch.

6. The apparatus of claim 5, wherein the switch further comprises a first switch, and wherein the LDO further comprises:
an amplifier having a first input terminal, a second input terminal, and an output terminal, wherein the first input terminal of the amplifier is coupled to the voltage divider, and wherein the second input terminal of the amplifier receives a reference voltage; and
a second switch having a first passive electrode, a second passive electrode, and a control electrode, wherein the first passive electrode of the second switch is coupled to the control electrode of the first switch, and wherein the control electrode of the second switch is coupled to the output terminal of the amplifier.

7. The apparatus of claim 5, wherein the feedback circuit further comprises an output resistor that is coupled to second passive electrode of the switch.

8. The apparatus of claim 7, wherein the LDO further comprises a first LDO, and wherein the apparatus further comprises a second LDO that is coupled across the output resistor and coupled to the control electrode of the switch.

9. The apparatus of claim 7, wherein the switch and transistor further comprise an NMOS transistor and a PMOS transistor, respectively.

10. The apparatus of claim 9, wherein the diode is a Zener diode.

11. A method comprising:
applying a control signal to a control electrode of a switch and to a diode;
generating a feedback signal from an output signal of the switch;
generating a steering current for a current minor by the application of an output signal of the diode to a first passive electrode of a first transistor and application of the output signal of the switch to a control electrode of the first transistor;
amplifying the difference between the feedback signal and a threshold; and
applying the amplified difference to a control electrode of a second transistor, wherein second transistor is coupled between the control electrode of the switch and the current mirror.

12. The method of claim 11, wherein the method further comprises:
generating an oscillating signal from a current source; and
generating the control signal from the oscillating signal with a charge pump.

13. The method of claim 12, wherein the diode is a Zener diode.

14. The method of claim 13, wherein the step of generating the feedback signal further comprises voltage dividing the output signal from the switch.

15. The method of claim 14, wherein the method further comprises:
applying the output signal from the switch to an output resistor;
applying the voltage drop across the output resistor to an LDO, wherein the LDO is coupled between the control electrode of the switch and the current mirror.

* * * * *